United States Patent
Simola et al.

(10) Patent No.: US 9,428,593 B2
(45) Date of Patent: Aug. 30, 2016

(54) POLYMERIZATION REACTOR FOR BUTYL RUBBER PRODUCTION

(75) Inventors: Flavio Simola, Monterotondo (IT); Aldo Appetiti, Rome (IT); Andrea Angeletti, Rome (IT)

(73) Assignee: CONSER SPA, Rome (IT)

( * ) Notice: Subject to any disclaimer, the term of this patent is extended or adjusted under 35 U.S.C. 154(b) by 494 days.

(21) Appl. No.: 14/122,039

(22) PCT Filed: May 26, 2011

(86) PCT No.: PCT/IT2011/000177
§ 371 (c)(1),
(2), (4) Date: Nov. 25, 2013

(87) PCT Pub. No.: WO2012/160579
PCT Pub. Date: Nov. 29, 2012

(65) Prior Publication Data
US 2014/0086801 A1    Mar. 27, 2014

(51) Int. Cl.
*B01J 19/00* (2006.01)
*B01J 19/18* (2006.01)
(Continued)

(52) U.S. Cl.
CPC ............. *C08F 2/01* (2013.01); *B01J 19/006* (2013.01); *B01J 19/1875* (2013.01); *C08F 210/12* (2013.01); *B01J 2219/00081* (2013.01); *B01J 2219/00254* (2013.01)

(58) Field of Classification Search
CPC .... B01J 19/00; B01J 19/0053; B01J 19/006; B01J 19/18; B01J 19/1868; B01J 19/1875; B01J 2219/00049; B01J 2219/00051; B01J 2219/00074; B01J 2219/00076; B01J 2219/00081; B01J 2219/00245; B01J 2219/00254; B01J 2219/00761–2219/00765; C08F 2/01; C08F 210/12; C08F 236/08; C08F 2/00; C08F 210/00; C08F 210/04–210/10; C08F 236/00–236/04
See application file for complete search history.

(56) References Cited

U.S. PATENT DOCUMENTS

| | | |
|---|---|---|
| 2,474,592 A | 6/1949 | Palmer |
| 2,507,105 A | 5/1950 | Howard et al. |

(Continued)

FOREIGN PATENT DOCUMENTS

| | | |
|---|---|---|
| CA | 463 453 | 2/1950 |
| DE | 12 15 936 | 5/1966 |

(Continued)

OTHER PUBLICATIONS

International Search Report dated Feb. 14, 2012, corresponding to PCT/IT2011/000177.

*Primary Examiner* — Natasha Young
(74) *Attorney, Agent, or Firm* — Young & Thompson

(57) ABSTRACT

A low temperature polymerization reactor for the production of butyl rubber by catalytic polymerization of isobutylene with small amount of a conjugated diolefin such as isoprene includes: an extended upper head with fluid deflector fixed to the top tube-sheet, the shapes of the head and deflector being optimized in order to reach a very homogeneous slurry velocity in the rows of tubes and to minimize the pressure drop due to the inversion of flow from up-flow to down-flow and to the entrance of the slurry in the tubes; an hemispheric bottom head with fluid deflectors placed between the impeller and the bottom itself and designed to minimize the pressure drop due to the inversion of flow from down-flow to up-flow; and straightening baffles inside the draft tube, which shape and dimensions are optimized to turn the radial velocity components produced by the rotation of the impeller into axial velocity components.

8 Claims, 5 Drawing Sheets

(51) Int. Cl.
  *C08F 2/00*    (2006.01)
  *C08F 2/01*    (2006.01)
  *C08F 210/12*  (2006.01)
  *C08F 210/00*      (2006.01)
  *C08F 210/04*      (2006.01)
  *C08F 210/06*      (2006.01)
  *C08F 210/08*      (2006.01)
  *C08F 236/00*      (2006.01)
  *C08F 236/02*      (2006.01)
  *C08F 236/04*      (2006.01)
  *C08F 236/08*      (2006.01)

(56) References Cited

U.S. PATENT DOCUMENTS

| | | |
|---|---|---|
| 2,577,856 A | 12/1951 | Nelson |
| 2,636,026 A | 4/1953 | Nelson |
| 2,999,084 A | 9/1961 | Arnold et al. |
| 3,737,288 A | 6/1973 | Hochman |
| 3,790,141 A | 2/1974 | Champeau |
| 3,965,975 A | 6/1976 | Edmundson |
| 3,991,129 A * | 11/1976 | Daniels ............ C08F 240/00 585/504 |
| 4,472,061 A | 9/1984 | Mansour |
| 5,417,930 A | 5/1995 | McDonald et al. |
| 5,972,661 A | 10/1999 | Kubera et al. |

FOREIGN PATENT DOCUMENTS

| | | |
|---|---|---|
| EP | 0053585 | 6/1982 |
| EP | 0209253 | 1/1987 |
| RU | 1615935 | 10/1994 |
| RU | 2097122 | 11/1997 |
| WO | 96/20777 | 7/1996 |

* cited by examiner

IMPROVED REACTOR

CONVENTIONAL REACTOR

SHAPED TOP DEFLECTOR

SHAPED BOTTOM DEFLECTORS

STRAIGHTENING BAFFLES

DISC AND DOUGHNUT BAFFLES

POLYMERIZATION REACTOR FOR BUTYL RUBBER PRODUCTION

This application claims the benefit of priority to PCT/IT2011/00077, now WO 2011/IT2011/00177, filed on May 26, 2011, the entire contents of which is incorporated herein by reference.

A low temperature polymerization reactor for the production of butyl rubber by catalytic polymerization of isobutylene with small amount of a conjugated diolefin such as isoprene.

The single pass tubular reactor is characterized by improved thermal efficiency and improved hydraulic efficiency, in order to permit higher productivity, lower energy consumption and longer reactor cycle time.

FIELD OF DISCLOSURE

This invention relates to an improved reactor for the agitated suspension polymerization of an isoolefin in the presence of a Friedel-Crafts catalyst, to form a suspension or slurry of fine rubber particles in the reaction medium.

A preferred group of isoolefin polymers are the butyl rubber type polymers, which are prepared by copolymerizing from about 99.5 mol percent of isobutylene with, correspondingly, from about 5 to 0.5 mol percent of a conjugated diolefin such as isoprene.

The polymerization reaction may be conducted at any suitable polymerization temperature such as the temperature range of about −90 to about −105° C.

A preferred catalyst is aluminum chloride.

The polymerization reaction is conducted with agitation in suspension in a low freezing diluent, typically an alkyl halide such a methyl chloride. The rubber slurry inside the reaction has a rubber content of 20 to 35% by weight. The low temperatures necessary for a satisfactory copolymerization are maintained by heat exchange with a suitable refrigerant such as vaporizing liquid ethylene or liquid methane.

BACKGROUND OF THE INVENTION

The copolymer of isobutylene and isoprene, commonly known as butyl rubber (IIR) and the halobutyl rubber (HIIR) derived from butyl rubber by addition of bromine or chlorine, are extensively used in several applications, being the tire manufacture the major.

In the prior art several inventions have been applied to the design of the polymerization reactor for the production of the butyl rubber.

U.S. Ser. No. 448,575, filed Jun. 26, 1942 then abandoned, and CA 463453 both by John H. Bannon may be considered among the first applications on the concept of the tubular polymerization reactor. In this reactor a draft tube provided with an agitator is arranged centrally of the reactor and a plurality of return tubes are arranged between headers and around the central draft tube, with means for circulating a suitable refrigerant, desirably vaporizing ethylene, through the space between the headers and around the central draft tube as well as the return tubes.

A back-mixed reactor is employed; typically a one-tube pass system as described by reference to U.S. Pat. No. 2,474,592. Such reactor consists of a vertical vessel formed by an enclosing side wall within which is provided an axially mounted draft tube of relatively large diameter surrounded by large number of small diameter tubes which extend downwardly. An axial flow pump, which extends into the draft tube is located in the bottom of the reactor to pump the reaction mixture up the draft tube. The reaction mixture includes the diluents, catalyst and reactants, which are directly introduced into the bottom of the reactor, and a portion of the reaction mixture which after up flowing through the draft tube is recycled from the top of the reactor downwardly through the tubes which surround the draft tube. The outer walls of the reaction vessel form a jacket through which a liquid hydrocarbon coolant is circulated to remove the exothermic heat of reaction via heat exchange contact with the outer walls of the small diameter tubes, and wall of the central draft tube.

U.S. Pat. No. 2,577,856 and its continuation-in-part application U.S. Pat. No. 2,636,026 represent a different version of the vertical shell and tube reactor, in which the central draft tube provided with an impeller is surrounded, rather than by several smaller tubes, by concentric annular surfaces, continually withdrawing heat from the annular walls by indirect heat transfer with a coolant circulating in one or more annular chambers. The second patent describes a serious problem encountered in each commercial tubular reactor, due to accumulation of polymer on the upper entrance tube sheet and plugging of the return tubes, especially at their entrance ends; the trouble is general and persistent under widely varying conditions of operation.

U.S. Pat. No. 2,999,084 concerns the use of the vertical tubular reactor with the central draft tube, wherein the improvement comprises the injection of the feed solution containing isobutylene/isoprene in methyl chloride at a zone of higher stream velocity immediately below the propeller. The patent refers that in commercial experience the mass fouling is a limiting factor of prime importance with respect to the rate of production of butyl rubber polymer; fouling inhibits adequate refrigeration and is the reason of the operation of the reactor in run having intervals within the range of about 10 to 90 hours; cleaning out the reactor before resuming the polymerization reaction normally requires 10 to 20 hours.

European patent EP0053585 proposes a different type of polymerization reactor suitable for the production of butyl rubber at a temperature ranging from −40 to −110° C. The reactor incorporates an internal rotary coolant chamber, a coaxial agitator and an external cooling jacket. The outer and inner faces of the rotary chamber are kept clean by rotating scrapers.

Even if this type of reactor can keep the heat exchange surfaces free from rubber deposits, it has the disadvantage of a limited exchange surface and therefore of a limited productivity.

The European patent EP0209253 describes a still fully different polymerization reactor and process, in which the monomers mixture of isobutylene and isoprene together with a polymerization medium, consisting in a mixture of halogenated and not halogenated hydrocarbons, is polymerized in a self cleaning screw extruder at a temperature of −50 to +15° C., somewhat higher than prior art close to −100° C. Heat of polymerization is removed by evaporative cooling of the reaction medium. Even if of academic interest, this application, due to the high reaction temperature, is not able to produce butyl rubber acceptable by the market and it has not been used industrially.

The Russian patents RU1615935 and RU2097122 propose a reactor applicable for butyl rubber, wherein the arrangement of the polymerization slurry and the cooling medium is the opposite compared with the conventional vertical tubular reactor with central draft tube: the polymerization reaction occurs in the shell of the vessel, supplied with a central multiple blades stirrer, while the refrigerating ethylene passes through vertical tube bundles (four in the patent drawings) peripherally disposed and put in from the upper head of the reactor. A drawback of this invention is the high asymmetric arrangement, due to the position of the tube bundles, and the highly not homogeneous velocity of the rubber slurry inside the reactor vessel.

In spite of the alternative reactor arrangements described in the above mentioned and in other patents, as reported in the Ullmann's-Encyclopedia of Industrial Chemistry-fifth edition, the most used industrial reactor corresponds to the vertical tubular reactor with draft tube model, as proposed in the original U.S. Ser. No. 448,575 and better defined in U.S. Pat. No. 2,474,592 and U.S. Pat. No. 2,999,084.

Whereas this reactor has been commercially used by the industry for many years for conducting these types of reactions, the reactor is less efficient than desirable.

Effective agitation is of particular importance in that the polymerization reaction is exothermic and in that the molecular weight of the polymer product is adversely affected by increases in temperature. Thus, when the reaction medium is not of an entirely homogeneous composition, localized overheating may occur, resulting in the formation of undesirable polymeric materials which adhere tenaciously to metal surfaces within the reaction vessel. This phenomenon, commonly referred to as mass fouling, has presented a problem with respect to the production of butyl rubber.

Moreover, a gradual and uniform buildup of polymer deposits upon and fouls the heat transfer surfaces within the reaction vessel; the polymer adheres to the metal surfaces as a continuous film. Nevertheless, polymer fouling presents a problem and, in consideration of the downtime to remove the fouling, it has limited the efficiency of this type of reactor, as also reported in the above mentioned U.S. Pat. No. 2,999,084.

In U.S. Pat. No. 5,417,930, Exxon describes a new model of butyl rubber tubular reactor, without the draft tube and having a reduced fouling tendency compared with the older conventional type of reactor with central draft tube, as described in U.S. Pat. No. 2,999,084 and in other patents.

The reactor contains a two-tubes pass system, constituted of an inner or center tube bundle, through which a mixture or slurry of polymerizable monomers, diluent and catalyst is passed in one direction and recycled via an outer tube bundle in the opposite direction in essentially even flow distribution.

The tubular bundles are maintained within a jacketed section, where a refrigerant removes the exothermic heat of reaction from the polymerization mixture and maintains the polymerization mixture at uniformly low temperature. An even flow circulation of the slurry, which aids in maintaining uniform low temperature, is provided by the use of a diffuser and mixed flow pumping system.

The proposed model is more complex than the conventional reactor and further subject of limiting factors.

In fact while it may be agreed in principle that the flow distribution in the inner tube bundle will be uniform, such uniformity does not appear to be granted for what concerns the flow distribution in the outer tube bundle.

Furthermore the pressure drop in the two-tube pass design will be higher compared with the conventional simple-pass design.

These and other considerations show that there is a need for better design of a single pass reactor for the production of the butyl rubber.

SUMMARY OF THE INVENTION

The present invention concerns an improved design of a single pass reactor, herewith shown in FIG. 1, for the production of butyl rubber, characterized by a superior design of thermal and hydraulic efficiency compared with the conventional type of reactor (FIG. 1a) described in U.S. Pat. No. 2,999,084 which can be considered as the closest prior art.

The improvements are reached by the following combinations:

a) an extended upper head with fluid deflector wherein the shape of the head and of the deflector are optimized in order to reach a very homogeneous slurry velocity in the rows of tubes and to minimize the pressure drop due to the inversion of flow from up-flow to down-flow and to the entrance of the slurry in the tubes; the better performance is achieved increasing the top zone eight and guiding the fluid in its curve by installing fluid deflector fixed to the top tube-sheet.

b—an hemispheric bottom head with fluid deflectors placed between the impeller and the bottom itself and designed to minimize the pressure drop due to the inversion of flow from down-flow to up-flow;

c—straightening baffles inside the draft tube, which shape and dimensions are optimized to turn the radial velocity components produced by the rotation of the impeller into axial velocity components, wherein such innovations, improving substantially the homogeneity of the velocity and reducing the overall pressure drop, allow an increased circulation in the bottom pump and longer reactor cycles.

In particular, according to a feature of the present invention, the straightening baffles are designed as surfaces with a lower curved part and an upper straight radial part and the curved parte is constructed (trying to be almost tangent to the velocity field after the impeller in the lower part and vertical in the upper part) as a sequence of radial segments: starting from the bottom and going upwards each one has an increasing angular coordinate together with an increasing axial coordinates.

As a consequence of the innovative design of a single pass reactor as above described, the following results are achieved:

A—Thermal Efficiency a1—Higher tube side (rubber slurry) heat transfer, thanks to the higher and more homogeneous slurry velocity in the tubes.

a2—Higher shell side (vaporizing ethylene) heat transfer, by using internal baffles.

a3—Slower increase of the fouling factor in the tube side during the reactor run.

B—Hydraulic Efficiency b1—The new shape of the upper head and of the fluid deflector, in addition to permit to reach a very homogeneous slurry velocity in the rows of tubes and to minimize the pressure drop due to the inversion of flow from up-flow to down-flow and to the entrance of the slurry in the tubes, minimizes also the vortex at the entrance of the tubes and eliminated the bad slurry distribution (velocity nearly to zero in the external part of the tubes) occurring in the old design reactors.

b2—The presence of an hemispheric bottom head with fluid deflectors, satisfy the requirement of a straight flow field at the end of the draft tube while the high turbulent intensity zones are only after the impeller zone.

b3—Straightening baffles in the draft tube, avoid the possible pseudo-helicoidal motion inside the draft tube generated by the rotation of the impeller, allowing an increased hydraulic efficiency.

BRIEF DESCRIPTION OF THE FIGURES

A better understanding of the invention will be obtained by considering the detailed description below, with reference to the following drawings in which.

Figure 1:
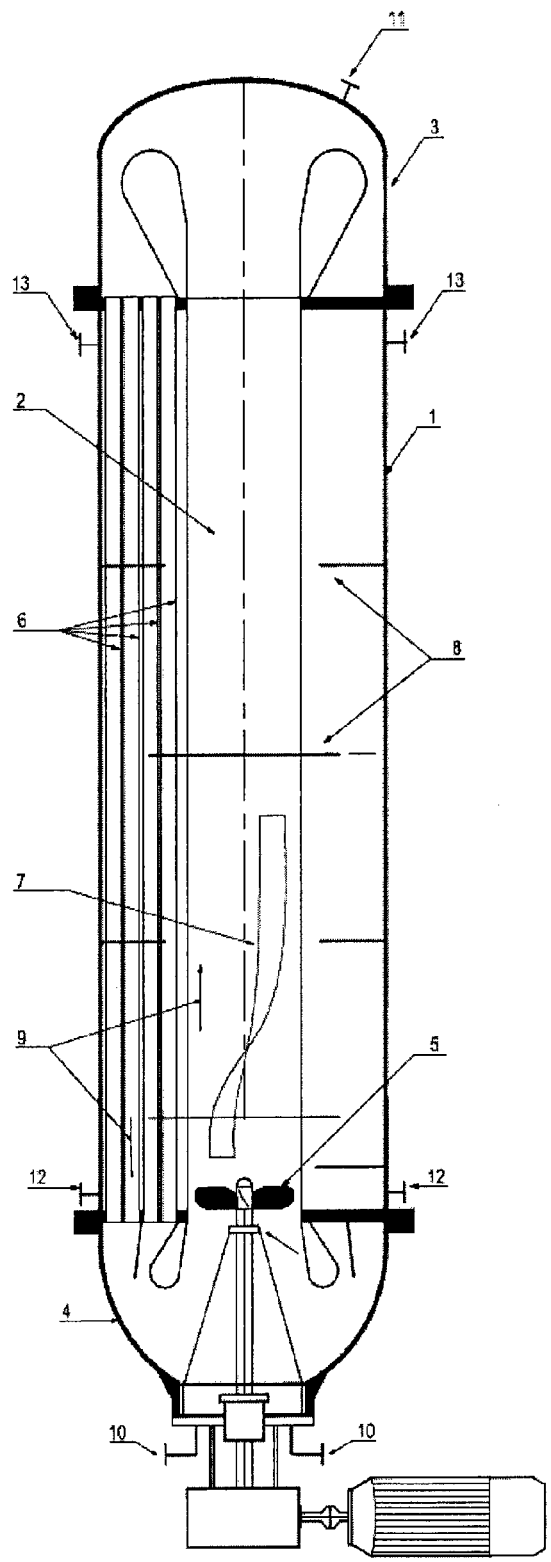
FIG. 1 is a sectional view of the reactor according to the present invention for the production of butyl rubber.

Reference is made to a polymerization reactor 1 in which the rubber slurry circulates according to the flow directions 9 inside four rows of vertical pipes 6 (from the top to the bottom) and a draft tube 2 (from the bottom to the top), pushed by a rotating impeller 5 put in the lower part of the draft tube. All these parts are included in a cylindrical vessel with two curved heads.

The reacting fluid 10 is introduced from the bottom side near the impeller shaft, while the outflow 11 is on the top.

The recirculating volumetric flow rate is of 500 to 600 times greater than the inflow rate.

In the top region the flow must invert its direction coming from the draft tube and going into the pipe rows. In the conventional draft tube reactor, this inversion is quite dissipative as it happens in a short distance without a guide to the flow. The direction of the fluid at the pipes inlet has a big radial component not aligned with the pipes axis; this produces a not uniform distribution of the flow among the pipes, with the external pipes velocity almost double respect to the inner ones and a relevant pressure loss at the pipes inlet (together with the inversion zone).

In order to improve the performances of the reactor, shape modifications have been introduced to reach the target of re-equilibrating the flow among the pipe rows (trying to reach an homogeneous mean velocity) and reducing the pressure drop in the top zone.

Figure 2:
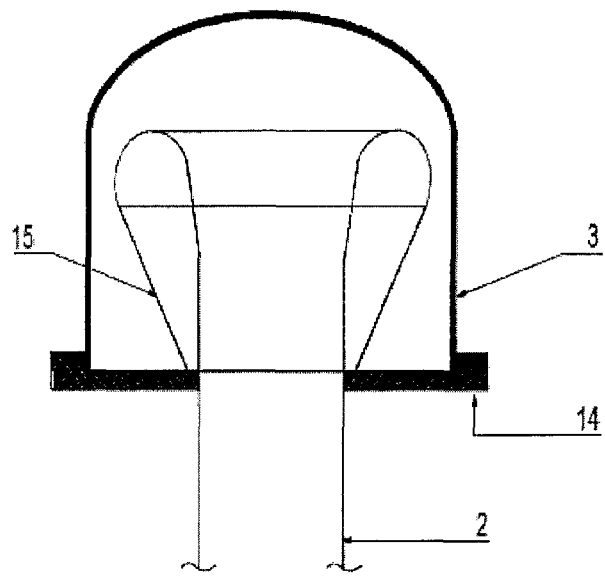
FIG. 2b is the detail of the shaped top deflector of FIG. 1.

The results of optimization show that a better performance can be achieved increasing the top zone height (because the fluid has more space to change its direction without strict deviations from the boundary and arriving at the pipes inflow more vertical) and guiding the fluid in its curve reducing vortices and turbulent dissipation, by installing shaped flow conveyors 15 having an inclined bottom up drop shape cross section partially cut at its bottom portion fixed to the top tube-sheet 14, as shown in FIG. 2.

As global results it can be noticed that: as for the first target of an homogeneous mean velocity through the pipes, the maximum distance from the mean value has passed from around 40% to 5% or less, as for the second target of a lower pressure drop, evaluating the differential of total pressure from inflow to outflow (that is the specific energy that the impeller should give to the fluid to reach the design mass flow rate) it has been reduced in a very significant way.

Concerning the optimization of the bottom part of the reactor, in order to satisfy the requirement of a straight flow field at the end of the draft tube, a deflector after the impeller has been provided.

The impeller not only impresses a tangential velocity component (increasing the velocity magnitude and so the dissipation), but also is an intense turbulence source, so the pressure loss is definitely increased.

Figure 3:
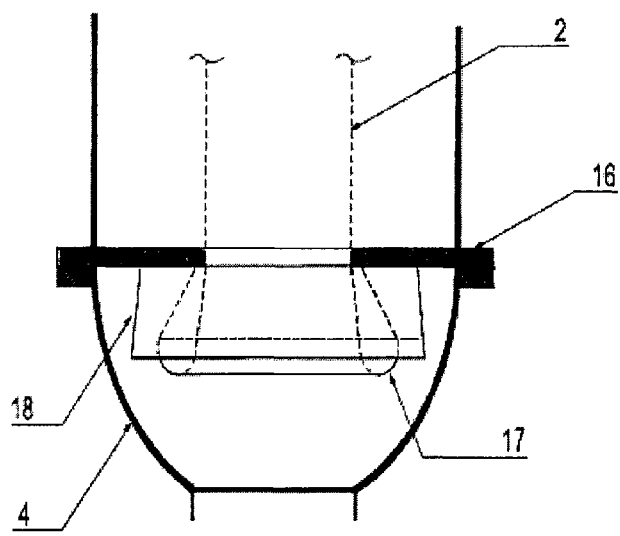
FIG. 3 is the detail of the shaped bottom deflector of FIG. 1.
Figure 4:
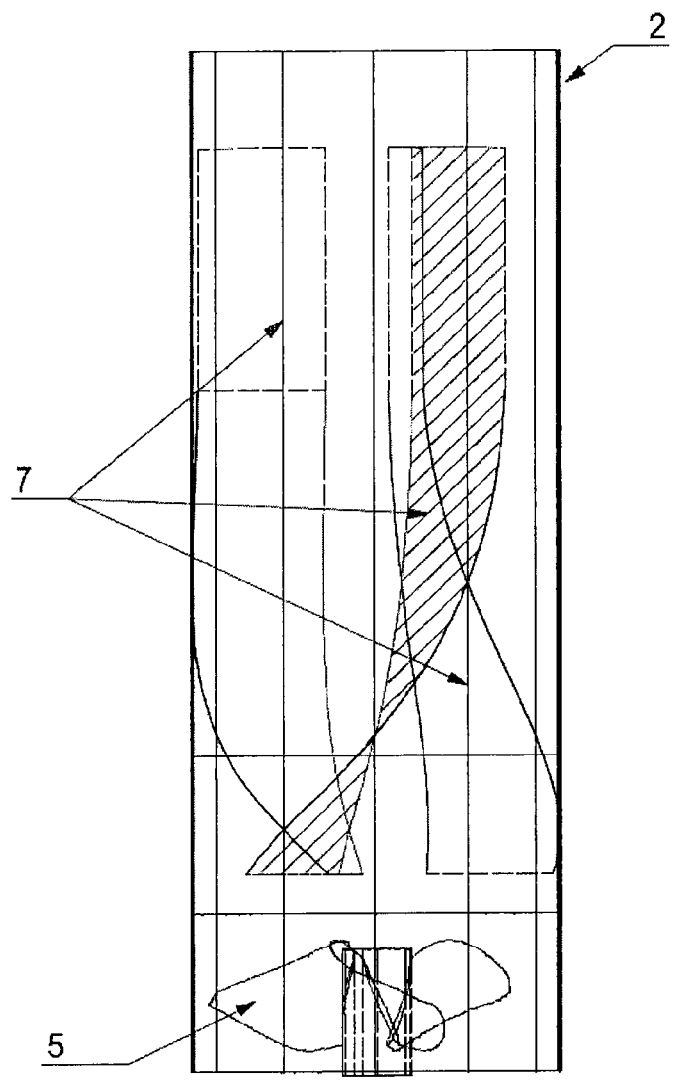
FIG. 4 is the detail of the straigtening baffles inside the draft tube of FIG. 1
Figure 4:
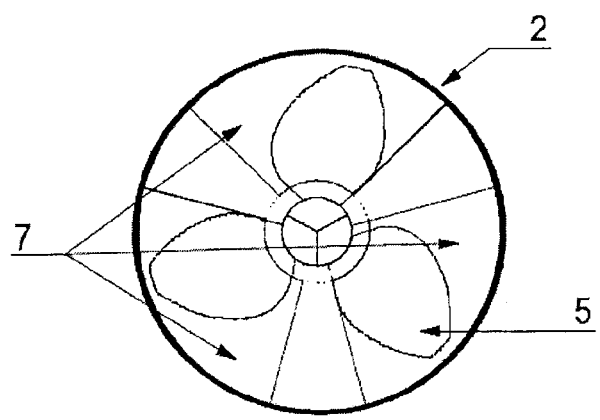

The basic criteria in optimization the bottom part is to provide more space to the flow to change its direction from downwards to upwards and guiding it in order to reduce chaotic streams and separations. The best results have been reached by using a simple semispherical head 4. This objective is further achieved by installing at bottoms shaped deflectors 17 and 18 fixed to the bottom tube-sheet 16 (FIG. 3) and straightening baffles 7 inside the draft tube 2 as shown in FIG. 4. The deflector 17 has an inclined bottom up drop shape cross section partially cut at its bottom portion, while the deflector 18, having a trapezoidal section, is located around the deflector 17.

As a result of these innovations the flow field in the bottom part is much more regular, without separations, the total pressure is more uniform, the high turbulent intensity zones are only after the impeller zone; all these features lead not only to lower pressure losses in the bottom part but also to a considerable increase of the pressure gain provided by the impeller that is better exploited because of a more uniform velocity distribution at the suction side.

Moreover the increased efficiency of the impeller permits also a reduced amount of the heat load to be removed by the reactor refrigerant and, therefore, the saving in energy consumption is twofold.

The rotation of the impeller induces tangential velocity component to the flow that, without any conditioning, would generate a pseudo-helicoidal motion inside the draft tube (with the mass flow rate mainly on the outer part due to centrifugal force).

To remove this effect the straightening baffles 7, introduced in the draft tube as shown in FIG. 4, has been designed as three surfaces (with a periodicity of 120°) with a lower curved part and an upper straight radial part. The curved part has been constructed trying to be almost tangent to the velocity field after the impeller in the lower part and vertical in the upper part.

Another innovative aspect of this invention refers to the arrangement of the cooling system in the shell side 19 of the tubular reactor 1. In all the industrial applications of the reactors for manufacturing butyl rubber the heat of polymerization, plus the heat generated by the rotating impeller, is removed by a circulation of vaporizing ethylene through a flash drum, normally located in a position above the reactor shell, in order to have the proper static differential head to balance the pressure losses, static and frictional, and to permit a thermosiphon circulation.

As a consequence of this liquid head, the point of initial vaporization deviates appreciably from the reactor jacket inlet point; in other terms the liquid ethylene 12 entering the reactor shell is normally in conditions of sub-cooling and the bottom part of the reaction is to preheat such liquid up to the real boiling temperature.

In a conventional butyl reactor the impact is very detrimental and substantially reduces the heat transfer efficiency and capacity; being the full area of the jacket available for the liquid, the resulting liquid ethylene velocity is very low and the resulting heat transfer coefficient is much lower than the value expected in vaporizing conditions.

This drawback may be overcome by using cross baffles 8, in order force the flow according to direction 20 and to permit an increased velocity and heat transfer coefficient of the refrigerant fluid. In consideration of the different degree of vaporization along the reactor height, with no vaporization at the inlet 12 and the lower part of the reactor and maximum vaporization at the outlet 13, the spacing between two consecutive baffles is not fixed and it is also changing with the reactor height.

Figure 5:
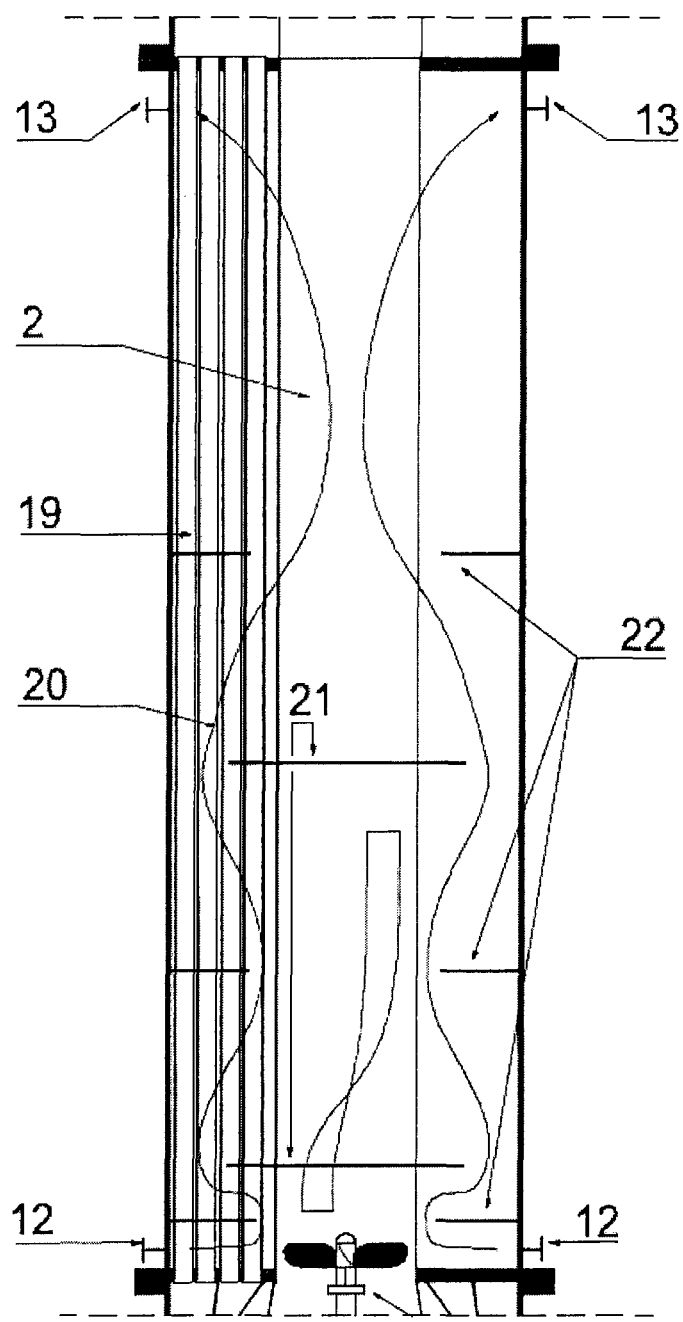
FIG. 5 is the detail of the disc and doughnut baffles in the shell side of FIG. 1.

Segmental, double segmental or disc 21 and doughnut 22 baffles may be used, being the last type, as shown in FIG. 5, the preferred one for this application.

EXAMPLES

Comparative Example 1

A conventional tubular, draft tube type reactor for the production of around 2.7 ton/hr of butyl rubber with Mooney viscosity of around 51 (ML 1+8 at 125° C.) has been subject to a Computational Fluid Dynamics (CFD) technique by using the commercial software by Fluent Inc.

Figure 1A:
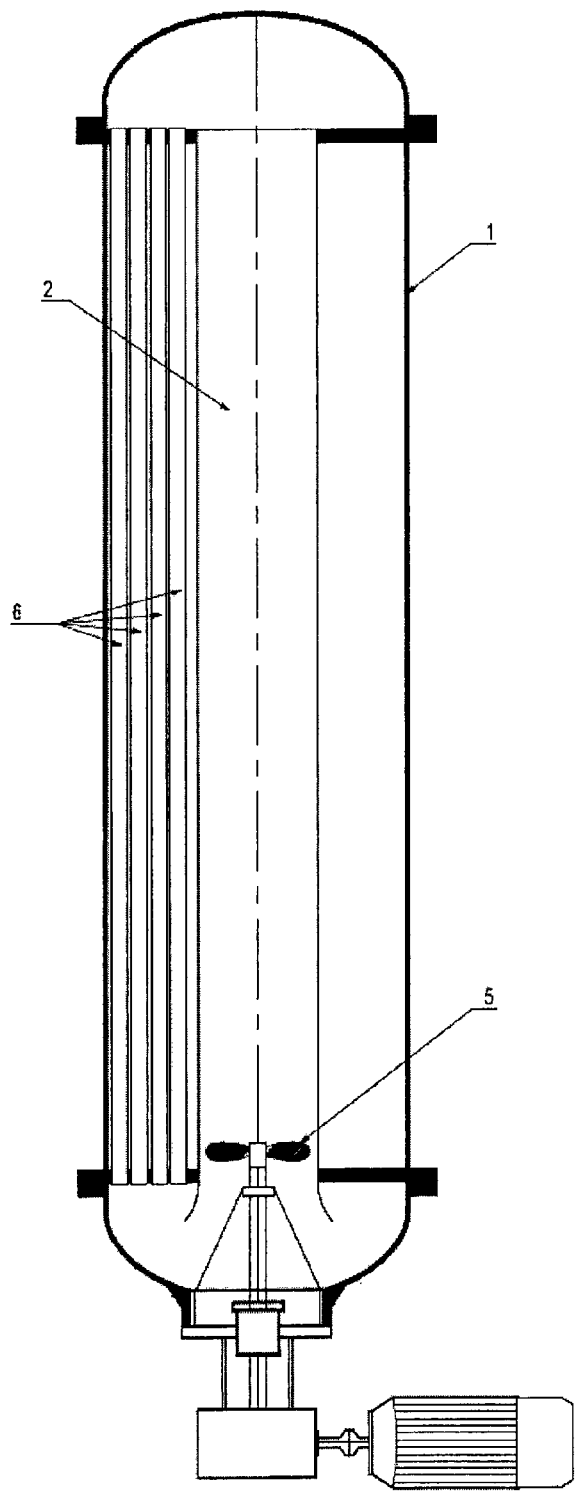
FIG. 1a is a sectional view of a conventional polymerization reactor for the same production.

The reactor, herewith represented in FIG. 1*a*, is a shell and tube vertical exchanger, with the reaction in the tube side and vaporizing ethylene as cooling medium in the shell side, to remove the exothermic heat of polymerization. The reactor includes a rotating impeller installed at the bottom, in the lower part of the central draft tube. The draft tube is surrounded by 120 vertical pipes, six meters length, disposed in four concentric rows. The reacting mixture is introduced from the bottom side, near to the impeller shaft, while the slurry product is drawn-off from a nozzle in the upper head. Both the bottom and top heads are of the standard semi-elliptical type.

The results of the different simulations showed different drawbacks of this type of reactor, as follows:
- an evident not uniform distribution of the flow among the pipes, with the external pipes velocity almost double respect the inner ones.
- the distribution of the velocity vectors inside the reactor shows that, in the top head, the slurry coming from the draft tube, due to the sudden inversion of the flow, knocks into the wall of the semi-elliptical head and the flow preferentially close to the same wall in a radiate motion, from the center to the external part of the reactor. Therefore the slurry arrives to the upper tube sheet mostly from its external part. This behavior entails two negative consequences, as follows:
  a. the velocity of the slurry in the external rows is much higher than in the central rows, as already described
  b. the rubber slurry enters the pipes tangentially rather than axially: this fact creates a large vortex at the inlet of the pipes with an evident not uniform velocity inside each pipe; here the slurry flows preferentially in the part of the pipe toward the center of the reactor, while the part of the pipe toward the external reactor wall has a velocity near to zero, promoting in this way the deposit of sticky rubber.

This result of the fluid-dynamic analysis, summarized in Table I confirms the experimental phenomenon described more than 50 years ago in the mentioned U.S. Pat. No. 2,636,026 (plugging of the reactor tubes, especially at their entrance ends).

TABLE I

| Conventional tubular reactor | |
| --- | --- |
| Average velocity in the pipes, m/s | 2.92 |
| Velocity distribution: | |
| $1^{st}$ row, m/s | 2.25 |
| $2^{nd}$ row, m/s | 2.00 |
| $3^{rd}$ row, m/s | 2.85 |
| $4^{th}$ row, m/s | 4.05 |
| Total reactor pressure drop, KPa | 29 |

Example 2

The example 2 represents an application of the improved reactor according to the present invention, as represented in FIG. 1.

The same reactor described in example 1 with 120 tubes has been improved by:
- an extended upper head with fluid deflector
- a semispherical bottom head with fluid deflectors
- three straightening baffles in the draft tube The combined effect of the above described modifications permits, even together with a reduced power consumption of the impeller, an higher average velocity, a more uniform distribution of the velocity in all parts of the reactor and a reduced pressure drop, as shown in Table II:

TABLE II

| Improved tubular reactor | |
| --- | --- |
| Average velocity in the pipes, m/s | 3.26 |
| Velocity distribution: | |
| 1st row, m/s | 3.22 |
| 2nd row, m/s | 3.23 |
| 3rd row, m/s | 3.22 |
| 4th row, m/s | 3.37 |
| Total reactor pressure drop, KPa | 20 |

The invention claimed is:

1. A single pass shell and tubes type polymerization reactor (1), used to produce butyl rubber in slurry, copolymerizing at least 95 wt % of isobutylene with not more than about 5 wt % of isoprene, in concentration of about 35% to 45% by vol. in a solvent, preferably methyl chloride, in presence of 0.015% to 0.15% by weight of catalyst, preferably aluminum chloride, and at a temperature within the range of −104° C. to −90° C., wherein the velocity in the tubes is in the range from 2.4 to 4.5 m/sec, wherein the reaction mixture is introduced from the bottom side near an impeller shaft (5) and the outflow (11) is in the top, with the reaction in tube side and a cooling media in the shell side (19) to remove the heat of reaction, and a circulation pump installed at the bottom (4), to permit high velocity of the rubber slurry in the central draft tube (2) and in downflow smaller tubes (6), the reactor comprising:
a—an extended upper head (3), containing a fluid deflector (15), having an inclined bottom up drop shape cross section partially cut at its bottom portion, wherein the shape of the head and of the deflector are sized to reach a very homogeneous slurry velocity in the rows of tubes (6) and to minimize the pressure drop due to the inversion of flow from up-flow to down-flow and to the entrance of the slurry in the tubes (6); the vortex at the entrance of the tubes being also minimized, while is eliminated any bad slurry distribution occurring in single pass of the old conventional design;
b—an hemispheric bottom head (4) with a first fluid deflector (17), having an inclined drop shape cross section partially cut at its upper portion, and a second fluid deflector (18) having a trapezoidal section, located around the first deflector (17), sized to minimize the pressure drop due to the inversion of flow from down-flow to up-flow;
c—three straightening baffles (7) in the draft tube (2), having a periodicity of 120° and designed as surfaces with a lower curved part and an upper straight radial part and the curved part is constructed as a sequence of radial segments in order to turn the tangential velocity components produced by the rotation of the impeller (5) into axial velocity components, allowing an increased hydraulic efficiency, wherein such combination improving substantially the homogeneity of the velocity and reducing the overall pressure drop, allows an increased circulation in the bottom pump and longer reactor cycles.

2. A reactor as in claim 1, wherein the extended upper head (3) is obtained increasing the top zone height.

3. A reactor as in claim 1, wherein the fluid deflector (15) is fixed to the top tube-sheet (14) and the bottom deflectors (17,18) are fixed to the bottom tube-sheet (16).

4. A reactor as in claim 1, wherein in the lower curved part of the straightening baffles (7) starting from the bottom and going upwards, in the sequence of radial segments each one has an increasing angular coordinate together with an increasing axial coordinates.

5. A reactor as in claim 1, further comprising a plurality of cross baffles (8) in the jacket side (19) for the circulation of the liquid coolant, which is either ethylene or methane, with single or plurality of nozzles for the removal of the coolant circulating at a temperature ranging from −120 to −100° C.

6. A reactor as in claim 5, wherein the cross baffles (8) are of the disc (21) and doughnut (22) type and therefore apt to force the flow according to direction (20) and to permit an increased velocity and heat transfer coefficient of the refrigerant fluid.

7. A reactor as in claim 5, wherein, in consideration of the different degree of vaporization along the reactor height, with no vaporization at the inlet (12) and the lower part of the reactor and maximum vaporization at the outlet (13), the spacing between two consecutive baffles (8) is not fixed and it is also changing with the reactor height.

8. A reactor as in claim 1, wherein the single pass tubes are located in from 2 to 8 rows, preferable from 3 to 5 rows.

\* \* \* \* \*